March 27, 1962　　　J. P. GLASS ETAL　　　3,027,076
VARIATION APPARATUS
Filed Sept. 2, 1958　　　　　　　　　　　　2 Sheets-Sheet 1
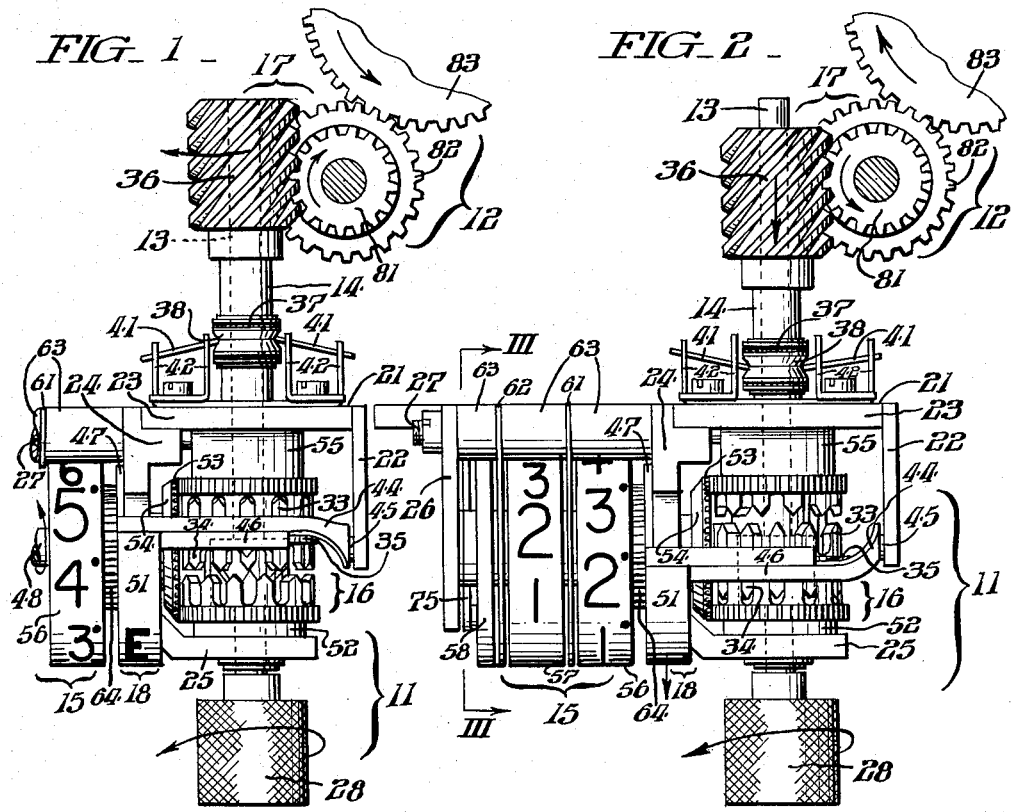
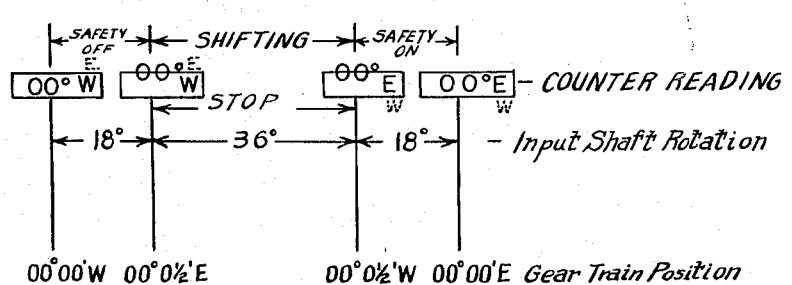
INVENTORS.
John P. Glass &
BY　Frank Zaic,
　　Paul & Paul
　　　ATTORNEYS.

March 27, 1962 J. P. GLASS ETAL 3,027,076
VARIATION APPARATUS
Filed Sept. 2, 1958 2 Sheets-Sheet 2
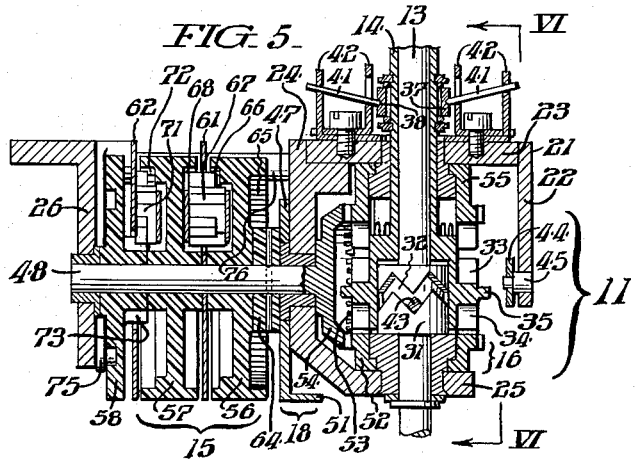
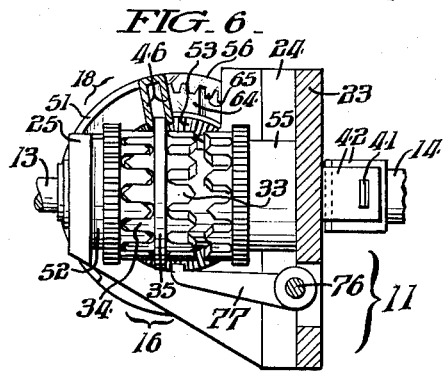
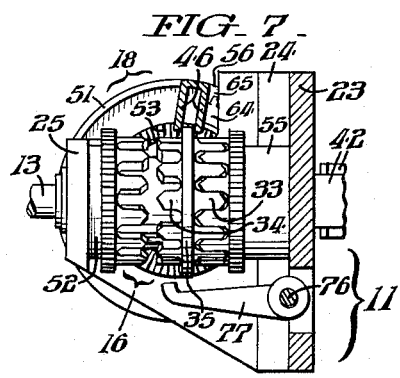
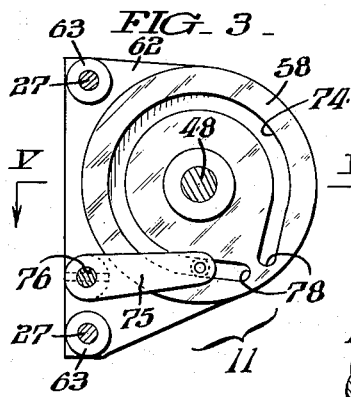
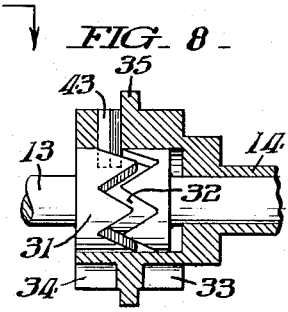
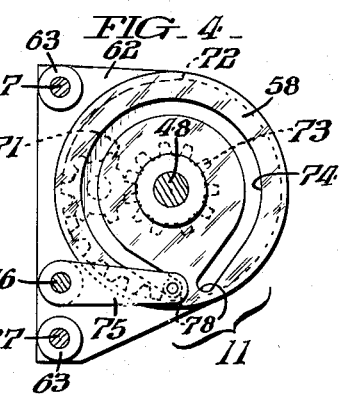
INVENTORS.
John P. Glass &
BY Frank Zaic,
Paul & Paul
ATTORNEYS.

United States Patent Office
3,027,076
Patented Mar. 27, 1962

1

3,027,076
VARIATION APPARATUS
John P. Glass, Ardmore, and Frank Zaic, Clifton Heights, Pa., assignors to Clifton Precision Products Co., Inc., Clifton Heights, Pa., a corporation of Delaware
Filed Sept. 2, 1958, Ser. No. 758,397
5 Claims. (Cl. 235—117)

This invention relates to a device for inserting a variation into a receiving gear train and indicating the size of the variation inserted, and more particularly concerns a device for inserting magnetic variation into a receiving gear train and indicating the size of the variation inserted. This invention also relates to apparatus for synchronizing the receiving gear train with the variation indicator.

In, for example, a device for computing and indicating continuously the position of an airplane in degrees of longitude and latitude, it is necessary to insert into the computing mechanism various corrections for magnetic variation, for wind velocity, and the like. When doing this it is desirable to have some visual indication of the amount of variation inserted into the mechanism. It is important therefore that the receiving mechanism and the indicating mechanism be synchronized. This presents a problem when the variation to be inserted changes, for instance, from a number of degrees of variation east to a number of degrees of variation west. When this happens, the direction of rotation of the indicating mechanism must be reversed. Much difficulty has been heretofore encountered in various attempts to accomplish such a result.

It is therefore an object of this invention to overcome the aforementioned difficulties and to provide a device for inserting a variation into a receiving gear train and indicating the size of the variation inserted.

It is another object of this invention to maintain the receiving gear train and the indicating mechanism in synchronism even when the direction of rotation of the indicating mechanism is reversed relative to the direction of rotation of the receiving gear train.

Other objects and advantages of this invention, including the simplicity and economy of the same, as well as the ease with which the device is operated, will further become apparent hereinafter and in the drawings in which:

FIG. 1 represents a view in top plan of a device constructed in accordance with this invention;

FIG. 2 represents a view in top plan similar to FIG. 1 but with the direction of counter wheel rotation being opposite that shown in FIG. 1;

FIG. 3 represents a view taken as indicated by the lines and arrows III—III which appear in FIG. 2;

FIG. 4 is a view similar to the view in FIG. 3 but at a different stage of operation;

FIG. 5 is a view in section taken as indicated by the lines and arrows V—V which appear in FIG. 3;

FIG. 6 is a view taken as indicated by the lines and arrows VI—VI which appear in FIG. 5;

FIG. 7 is a view similar to the view in FIG. 6 but showing the mechanism at a different stage of operation;

FIG. 8 is a view in an enlarged section of a portion of the clutch mechanism constructed in accordance with this invention; and FIG. 9 is a diagrammatic view which illustrates the position of the elements as the mechanism is shifted from indicating one hemisphere to indicating another.

Although specific terms are used for clarity in the following description, these terms are intended to refer only to the structure shown in the drawings and are not intended to define or limit the scope of the invention.

2

Turning now to the specific embodiment of the invention selected for illustration in the drawings, the number 11 designates generally a device for inserting a variation into a receiving gear train 12 and indicating the size of the variation inserted. Device 11 includes a rotatable input shaft 13, an output sleeve 14, counter means 15, mechanism 16 for transferring output sleeve rotation to counter means 15 and for reversing the direction of counter means rotation relative to output sleeve rotation, and helical gear mechanism 17 for synchronizing receiving gear train rotation with counter means rotation when the direction of counter means rotation is reversed relative to the direction of output shaft rotation.

Also provided is a reversal indicating mechanism 18 for indicating the direction of counter means rotation.

Support for device 11 is provided by a housing 21 including a right end plate 22, rear plate 23, intermediate plate 24, front plate 25, and left end plate 26 joined to intermediate plate 24 by rods 27. Input shaft 13 is provided with a knurled knob 28 that is rotated manually to insert the variation into device 11. Fixed to input shaft 13 is a collar 31 (FIGS. 5 and 8) having formed therein a zig-zag groove 32.

Output sleeve 14 fits slideably over input shaft 13 and is provided at one end with exterior oppositely facing teeth 33 and 34 which are separated by a ridge 35. Fixed to the other end of output sleeve 14 is a helical gear 36. Positioned intermediate the ends of output sleeve 14 is a collar 37 having a groove 38. An end of leaf springs 41 ride in groove 38. Leaf springs 41 are supported in brackets 42 which are screwed into rear plate 23. As is shown in FIGS. 5 and 8, sleeve 14 is provided with a pin 43 which rides in zig-zag groove 32. The position of ridge 35 controls the indication given by reversal indicating mechanism 18. Mechanism 18 is provided with a laterally extending arm 44 which is pivoted to right end plate 22 at pivot post 45. Depending from arm 44 are flanges 46 (FIGS. 6, 7) which abut ridge 35 and move arm 44 with ridge 35. The other end of mechanism 18 is provided with a plate 47 that is rotatable about counter shaft 48. A flange extending from plate 47 forms a flag 51 which bears the letters E and W, standing for east and west. Freely rotatable about input shaft 13 is a pinion 52 which is adapted to mesh with teeth 34 of output sleeve 14, and which also meshes with teeth 53 of face gear 54 attached to counter shaft 48. Also provided is another freely rotatable pinion 55 which meshes with teeth 53 of face gear 54 and which has teeth that are adapted to engage teeth 33.

Counter means 15 includes counter wheels 56, 57, 58, spacers 61 and 62 and spacer rollers 63.

As is more clearly shown in FIG. 5, counter means 15 is provided with a gear train that transmits rotation through its elements. A gear segment 64 is pinned to shaft 48 to rotate therewith. Gear segment 64 engages the teeth of an interior gear 65 of wheel 56. The opposite face of wheel 56 is provided with an interior gear 66 that rotates a carry-over pinion 67 in spacer 61. Carry-over pinion 67 rotates wheel 57 through an interior gear 68, and wheel 57 rotates carry-over pinion 71 through an interior gear 72. Pinion 71 rotates wheel 58 through gear 73.

As shown in FIG. 3, one face of wheel 58 is provided with a cam groove 74 in which rides a cam follower arm 75 which is fixed to shaft 76. Shaft 76 has affixed to its other end a latching arm 77 which when in its locking position as shown in FIG. 6 prevents accidental shifting of ridge 35.

FIG. 4 is a view similar to FIG. 3 except that cam follower arm 75 is at its stop position abutting against the cam stop 78. The position of latching arm 77 shown in FIG. 7 corresponds to the position of cam follower arm 75 shown in FIG. 4. In this position latching arm 77 is released to allow for the shifting of ridge 35.

Helical gear 36 (FIGS. 1 and 2) meshes with another helical gear 81 which is positioned with its axis at 90° from the axis of helical gear 36. Helical gear 81 rotates a gear 82 which in turn rotates a gear 83 in receiving gear train 12. Helical gears 36 and 81 are so arranged that when helical gear 36 is shifted forward by the action of sleeve 14, helical gear 81 is rotated in a direction opposite that imparted to it by the rotation of helical gear 36. This opposite rotation of gear 81 by the shifting of gear 36 enables the receiving gear train 12 to remain in synchronism with counter means 15, and compensates for the over travel of counter shaft 48 when the direction of counter shaft 48 rotation is being reversed.

In operation, the amount of variation desired is inserted into device 11 by manually rotating knurled knob 28. The amount of variation inserted is read through a window (not shown), which is positioned to one side of knob 28 and parallel to the surface of front plate 25. Through this window is read any variation from 180° east through 0 to 180° west. Wheel 56 shows units, wheel 57 shows tens, and wheel 58 shows the numeral 1 standing for 100 (not shown on drawing).

Rotation of knob 28 (FIG. 1) causes the rotation of output sleeve 14 and pinion 55 which rotates counter shaft 48 in the direction shown. It will be noted that in the plan view of FIG. 1, the flag 51 shows the letter E which means that through the window appears the letter W. In shifting the variation from west to east the counters will show a decreasing number of degrees until the counters show zero. Then, after passing from west to east, the counters must show an increasing number of degrees. To do this the counters must reverse the direction of their rotation after passing through zero. This is accomplished by stopping the rotation of the counter wheels after they reach zero, which stoppage is accomplished through cam follower arm 75 and cam 74 of wheel 58 which is allowed to rotate 18 degrees (of wheel rotation) after reaching the "00°" indication of counter means 15. Stoppage of the counter wheels stops the rotation of counter shaft 48 and halts the rotation of pinions 52 and 55. This causes interior pin 43 of output sleeve 14 to shift in zig-zag groove 32 since input shaft 13 continues to rotate. Shifting of pin 43 causes the shifting of sleeve 14 from the position shown in FIG. 1 to the position shown in FIG. 2. With teeth 34 in mesh with pinion 52, counter shaft 48 rotates in the opposite direction although the input shaft 13 and the output sleeve 14 continue to rotate in the same direction. Gear train 12 continued to rotate during the period that counter shaft 48 is rotated beyond the "00°" window reading to actuate the safety release and stop. It should be noted that in doing so, the counter shaft has accumulated ½° of excess motion (i.e., halfway between the indication of "00°" and "01°", 18 degrees of shaft rotation. Counter shaft 48 and its counter wheels would no longer be in synchronism with the receiving gear train 12 if means to compensate for the over travel of counter shaft 48 were not provided. But such compensation is provided through the shifting action of helical gear 36 and the effect of its shifting on helical gear 81. This shifting causes helical gear 81 to reverse its direction of rotation a sufficient amount to compensate for the over travel of counter shaft 48.

In FIG. 9 is shown diagrammatically the counter reading and the position of the receiving gear train (or receiving synchro which is connected to the receiving gear train). As is indicated, input shaft 13 rotates 18 degrees of shaft rotation while cam follower arm 75 moves from the position shown in FIG. 3 to the position shown in FIG. 4. This 18° of input shaft rotation is transferred to gear train 12, and moves cam follower arm 75 to the position shown in FIG. 4. Counter means 15 has no indication value, aside from having the indication "00°" raised above the center of the receiving window, when rotated this 18° so that counter means 15 and gear train 12 are no longer in synchronism. Instead, gear train 12 is ahead of counter 15 by 18° of input rotation or ½° of counter reading value.

Then when counter shaft 48 is stopped, the gear train 12 is also stopped, input shaft 13 rotates 36°. During this 36° rotation, while the shifting motion takes place, helical gear 36 of output sleeve 14 operates like a rack on helical gear 81. Gears 36 and 81 are so designed that the rack-like motion of gear 36 reverses the sense of direction of gear train 12 so as to compensate for the aforementioned 18° which counter 15 lags behind gear train 12. Moreover, this rack-like motion goes further and overcompensates by putting counter 15 ahead of gear train 12 by 18°. Then when counter shaft 48 is again engaged with input shaft 13, the 18° of input shaft rotation, which is lost to the counter indicator as cam follower arm 75 moves from the position of FIG. 4 to the position of FIG. 3, is made up so that counter 15 and gear train 12 are in synchronism. At this point the counter is in the position of FIG. 3 and the counter reading is 00° E as shown in FIG. 9.

It should be noted that after counter shaft 48 and input shaft 13 are engaged, helical gear 36 rotates in the same direction as input shaft 13 and the rotational values are transferred to gear train 12 in correct order. Since shafts 13 and 48 are engaged 18° before the counter 15 begins to indicate values or before the indication "00°" reaches the center of the viewing window, the need is evident for overcompensating by the 18° difference between gear train 12 and counter 15.

It is to be understood that the form of the invention herein shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described our invention, we claim:

1. A device for inserting an angular variation into a receiving gear train and indicating the size of the variation inserted, said device comprising a rotatable input shaft, an output sleeve rotatably and slidably mounted on the input shaft and driven thereby, rotatable counter means, means for transferring output sleeve rotation to the counter means, means for reversing the direction of counter means rotation relative to output sleeve rotation, a receiving gear train rotatably connected to the output sleeve, and means actuated by said counter means for synchronizing receiving gear train rotation with counter means rotation to compensate for lost motion which occurs when the direction of counter means rotation is reversed relative to the direction of output sleeve rotation.

2. A device for inserting an angular variation into a receiving gear train and indicating the size of the variation inserted, said device comprising a rotatable input shaft, an output sleeve rotatably and slidably mounted on the input shaft and driven thereby, rotatable counter means, means for transferring output sleeve rotation to the counter means, means for reversing the direction of counter means rotation relative to output sleeve rotation, a receiving gear train rotatably connected to the output sleeve, means actuated by said counter means for synchronizing receiving train rotation with counter means rotation to compensate for lost motion which occurs when the direction of counter means rotation is reversed relative to the direction of output sleeve rotation, and indicating means for indicating reversal of counter means rotation relative to the direction of output sleeve rotation.

3. A device for inserting an angular variation into a receiving gear train and indicating the size of the variation inserted, said device comprising a rotatable input shaft, an output sleeve positioned about and rotatable with the input shaft, rotatable counter means, means for transferring output sleeve rotation to the counter means, means for stopping and reversing the direction of counter means rotation relative to output sleeve rotation, a receiving gear train rotatably connected to the output sleeve, and means actuated by said counter means for compensating for the advance in receiving gear train rotation which is unreported by the counter means and which is caused by the over travel of counter means rotation as the direction of that rotation is reversed relative to the direction of output sleeve rotation.

4. For use in a device for inserting an angular variation into a receiving gear train and indicating the size of the variation inserted, said device comprising a rotatable input shaft, an output sleeve positioned about and rotatable with the input shaft, rotatable counter means, means for transferring output sleeve rotation to the counter means, means for reversing the direction of counter means rotation relative to output shaft rotation, a receiving gear train rotatably connected to the output sleeve, the apparatus comprising compensating means for synchronizing receiving gear train rotation with counter means rotation to compensate for lost motion which occurs when the direction of counter means rotation is reversed relative to the direction of output sleeve rotation, said compensating means comprising a helical gear mounted on the output sleeve, and a second helical gear in mesh with the first helical gear, the second helical gear being part of the receiving gear train, and the first helical gear and output sleeve being reciprocably mounted on the input shaft so that translational movement of the first helical gear rotates the second helical gear.

5. A device for inserting an angular variation into a receiving gear train and indicating the size of the variation inserted, said device comprising a rotatable input shaft, an output sleeve rotatably and slidably mounted on the input shaft and driven thereby, rotatable counter means, means for transferring output sleeve rotation to the counter means, means for reversing the direction of counter means rotation relative to output sleeve rotation, a receiving gear train rotatably connected to the output sleeve, means actuated by said counter means for synchronizing receiving gear train rotation with counter means rotation to compensate for lost motion which occurs when the direction of counter means rotation is reversed relative to the direction of output sleeve rotation, and means operatively connected to the input shaft for manually inserting a variation in the receiving gear train.

References Cited in the file of this patent
UNITED STATES PATENTS

| | | |
|---|---|---|
| 2,269,330 | Andren et al. | Jan. 6, 1942 |
| 2,311,005 | Thurlow et al. | Feb. 16, 1943 |
| 2,829,532 | Togstad | Apr. 8, 1958 |